United States Patent [19]

Franke et al.

[11] Patent Number: 5,286,765
[45] Date of Patent: Feb. 15, 1994

[54] PROCESS FOR THE PREPARATION OF FOUNDRY CORES AND MOLDS

[75] Inventors: Joachim Franke, Colonge; Hans-Dieter Jakob, Leverkusen, both of Fed. Rep. of Germany

[73] Assignee: Bayer Aktiengesellschaft, Leverkusen, Fed. Rep. of Germany

[21] Appl. No.: 810,795

[22] Filed: Dec. 19, 1991

Related U.S. Application Data

[63] Continuation of Ser. No. 581,484, Sep. 12, 1990, abandoned.

[30] Foreign Application Priority Data

Sep. 15, 1989 [DE] Fed. Rep. of Germany ....... 3930837

[51] Int. Cl.$^5$ ............................................... C08G 8/36
[52] U.S. Cl. .................................... 523/142; 164/526; 164/21
[58] Field of Search .................... 523/142; 164/526, 21

[56] References Cited

U.S. PATENT DOCUMENTS

| | | | |
|---|---|---|---|
| 3,428,110 | 2/1969 | Walker et al. | 164/21 |
| 3,431,969 | 3/1969 | Robins | 523/142 |
| 3,904,554 | 9/1975 | Furness et al. | 523/142 |
| 3,933,727 | 1/1976 | Schmid | 523/142 |
| 3,947,429 | 3/1976 | Bardet | 523/142 |
| 4,051,092 | 9/1977 | Holik et al. | 523/142 |
| 4,562,227 | 12/1985 | Rogler et al. | 524/786 |
| 4,582,723 | 4/1986 | Markert et al. | 427/116 |
| 4,728,676 | 3/1988 | Muller et al. | 521/107 |
| 4,788,224 | 11/1988 | Muller et al. | 521/107 |

FOREIGN PATENT DOCUMENTS

| | | |
|---|---|---|
| 1115922 | 10/1961 | Fed. Rep. of Germany . |
| 1483521 | 4/1970 | Fed. Rep. of Germany . |
| 3807660 | 9/1989 | Fed. Rep. of Germany . |
| 1303709 | 1/1973 | United Kingdom . |
| 2011432 | 7/1979 | United Kingdom . |

*Primary Examiner*—Paul R. Michl
*Assistant Examiner*—Edward Cain
*Attorney, Agent, or Firm*—Joseph C. Gil; Richard E. Henderson; N. Denise Brown

[57] ABSTRACT

This invention relates to a process for the preparation of foundry cores and molds by mixing a filler and a casting resin mixture and then curing the resultant mixture. The casting resin mixture is made from (a) 25 to 99.9% of at least one organic polyisocyanate, (b) 0.1 to 50% of at least one organic compound containing at least two epoxide groups, and (c) up to 50% of a polyhydroxyl compound, the quantities being based on the total quantity of resin.

16 Claims, No Drawings

PROCESS FOR THE PREPARATION OF FOUNDRY CORES AND MOLDS

This application is a continuation of application Ser. No. 07/581,484 filed Sep. 12, 1990.

BACKGROUND OF THE INVENTION

This invention relates to a process for the preparation of foundry cores and molds.

Curable resins are widely used in the foundry industry for making molds and cores which predetermine or produce the dimensions and cavities of the castings. Of particular importance in this regard is hot-curing and cold-curing mold and core sand binders based on phenolic, furan, and amino resins which contribute considerably towards economic mass-production casting and towards improving quality. At present, energy costs are closely related to process costs. Accordingly, processes in which as much energy as possible is saved are gradually acquiring a priority position. To help satisfy the need to save energy and costs, even with large series, so-called cold-box processes have in recent years been increasingly significant for the production of cores. Based on the use of curable resins, these processes represent a generally new processing variant in which one of the components is introduced into the curing reaction as a gas or aerosol. In foundry parlance, the polyurethane blowing process is known as a cold-box process and has been introduced under this name into the German foundry industry. According to the process described in German Auslegeschriften 1,483,521 and 2,011,365, polyhydroxyl compounds and polyisocyanates are mixed with the core sand and then crosslinked with an amine-based blowing agent as catalyst, thereby forming a polyurethane. The preferred polyhydroxyl compounds used in this process are resols produced, for example, using cobalt or lead naphthenate as catalyst and are often referred to in the relevant literature as benzyl ether resins. These compounds must be free from water because water would react prematurely with the polyisocyanate. To adjust viscosity to 130 to 450 mPa·s, the phenol resols contain approximately 30 to 35% by weight high-boiling solvents, such as aromatic and aliphatic hydrocarbons, esters, ketones, and the like. The polyisocyanates used in this process are generally diphenylmethane-4,4'-diisocyanate or derivatives thereof which are also diluted with solvents of the above-mentioned type. The cold-box binders are generally formulated in such a way that they are mainly used in a ratio of 1:1 with polyisocyanate. The total quantity of binder (including solvent) is about 1 to 2% by weight, whereas the total quantity of catalyst is about 0.02 to 0.10% by weight (based in both cases on the amount of sand). The process is carried out by initially shooting the core sand into the core box and then blowing in a mixture of amine and air as a gas or aerosol. The amines used in the process are generally triethylamine, dimethylethylamine, or dimethylisopropylamine which are introduced into the core box under a pressure of 0.2 to 2 bar. The residual gases are removed from the core with heated purging air or carbon dioxide gas and may be treated in an acid scrubber charged with dilute sulfuric acid or phosphoric acid. Suitable scrubbers work on the countercurrent principle. Significant advantages of this process include a considerable increase in productivity, smooth core surfaces by virtue of the excellent flowability of the sand during shooting, high dimensional accuracy through cold curing, and high strengths of the mold materials despite extremely short curing times. A disadvantage of this process is the limited storage life of the core sand because, even in the absence of amine, certain polyurethane polyaddition reactions begin in the core sand. In addition, the solvents of the binder and polyisocyanate solutions partly evaporate at the surface. Consequently, a reduction in strength occurs if the sand is processed a few hours after preparation. Thus, the cold flexural strength measures approximately 5.5 N/mm when blowing is carried out immediately after preparation of the sand but only 4 N/mm when blowing is carried out one hour after preparation of the sand. Reductions in strength of 25% and 60% are observed after 2 hours and 3 hours, respectively. In addition, the sand is impossible to process about 8 hours after preparation because it has solidified as the polyurethane reaction proceeds.

Accordingly, the problem addressed by the present invention was to develop a casting resin mixture which gives improved storage life for the prepared core sand without a reduction in the strength after a few hours. An extended processing time such as provided by the present invention affords considerable advantage in the production process used for the core sands and leads to a significant reduction in production costs because the core sand needs to be prepared with the polyurethane raw materials only once a day or less. Another problem addressed by the present invention was to develop core sand binders having higher strength values and higher heat resistance levels, which are needed in particular for more recently developed foundry applications.

SUMMARY OF THE INVENTION

The present invention relates to a process for the preparation of foundry cores and molds comprising (1) combining a filler and a casting resin mixture, wherein said casting resin mixture comprises
  (a) 25 to 99.9%, based on the total quantity of resin, of at least one organic polyisocyanate,
  (b) 0.1 to 50%, based on the total quantity of resin, of at least one organic compound containing at least two epoxide groups,
  (c) 0 to 50%, based on the total quantity of resin, of a polyhydroxyl compound, and
  (d) optionally, auxiliaries, additives, and solvents; and (2) curing the combined filler and casting resin mixture.

In one preferred embodiment, the ratio of reactive isocyanate groups to hydroxyl groups in the casting resin mixture is greater than about 1.1:1 (more preferably, greater than 1.5:1).

A particularly suitable filler is sand, although silica powder, chalk, aluminum oxide, corundum, metal powders, ceramic powders, or even plastic powders are also suitable.

DETAILED DESCRIPTION OF THE INVENTION

It may be regarded as particularly surprising that the additional use, relative to the prior art, of an organic compound containing at least two epoxide groups should lead to outstanding storage stabilities and strength values. It may also be regarded as particularly surprising that, despite a ratio of reactive isocyanate to hydroxyl groups in the casting resin mixture of at least 1.1:1 (preferably at least 1.5:1), improved storage stability and increased strength values are also observed precisely where, according to the prior art, lower strength values are obtained through over-crosslinking or under-crosslinking of polyurethane resins. See Gardziella in Becker/Braun, Kunststoffhandbuch, Vol. 10, Duroplaste, page 976. Polyhydroxyl compounds need not be present at all because curing is readily attained solely by amine catalysis of the isocyanate epoxide mixture for processing times of several hours. It is also surprising that the blowing time (i.e., the catalysis time) of these mixtures need not extended in comparison with the prior art, as might have been expected from a knowledge of macromolecular chemistry.

In one preferred embodiment, at least part of component (a) is mixed with at least part of component (b) in a preliminary reaction step and the resulting mixture is made stable in storage by the use of a reaction inhibitor. In particular, at least part of component (a) can be mixed with at least part of component (b) in a preliminary reaction step to form an intermediate product containing oxazolidinone and isocyanurate groups. This preliminary reaction is stopped when no more than 65% of the isocyanate groups present in the starting mixture are converted to the intermediate product by addition of a reaction inhibitor so that the reaction mixture remains stable in storage. Despite the use of reaction inhibitors, re-catalysis by blowing with the amine is readily possible.

Starting component (a) may be selected from any organic polyisocyanates of the type known from polyurethane chemistry. Suitable organic polyisocyanates include aliphatic, cycloaliphatic, araliphatic, aromatic, and heterocyclic polyisocyanates of the type described, for example, by W. Siefken in *Justus Liebigs Annalen der Chemie*, 562, 75–136. Suitable polyisocyanates include those corresponding to the formula $Q(NCO)_n$ wherein n is a number from 2 to 4 (preferably 2), and Q represents an aliphatic hydrocarbon group containing from 2 to about 18 (preferably from 6 to 10) carbon atoms, a cycloaliphatic hydrocarbon group containing from 4 to about 15 (preferably from 5 to 10) carbon atoms, an aromatic hydrocarbon group containing from 6 to about 15 (preferably 6 to 13) carbon atoms, or an araliphatic hydrocarbon group containing from 8 to about 15 (preferably from 8 to 13) carbon atoms. Examples of suitable polyisocyanates include ethylene diisocyanate, 1,4-tetramethylenediisocyanate, 1,6-hexamethylenediisocyanate, 1,12-dodecanediisocyanate, cyclobutane-1,3-diisocyanate, cyclohexane-1,3- and -1,4- diisocyanate and mixtures thereof, 1-isocyanato-3,3,5-trimethyl-5-isocyanatomethyl cyclohexane (German Auslegeschrift 1,202,785 and U.S. Pat. No. 3,401,190), 2,4- and 2,6-hexahydrotoluene diisocyanate and mixtures thereof, hexahydro-1,3- and/or 1,4-phenylene diisocyanate, 1,3- and 1,4-phenylenediisocyanate, 2,4- and 2,6-toluenediisocyanate and mixtures of these isomers, diphenylmethane-2,4′- and/or -4,4′-diisocyanate and other polyisocyanates of the diphenylmethane series, and naphthylene-1,5-diisocyanate.

It is also possible to use, for example, triphenylmethane-4,4′,4″-triisocyanate, polyphenyl polymethylene polyisocyanates of the type obtained by condensing aniline with formaldehyde, followed by phosgenation (British Patents 874,430 and 848,671), m- and p-isocyanatophenylsulfonyl isocyanates (U.S. Pat. No. 3,454,606), perchlorinated aryl polyisocyanates (U.S. Pat. No. 3,277,138), polyisocyanates containing carbodiimide groups (U.S. Pat. No. 3,152,162), norbornane diisocyanates (U.S. Pat. No. 3,492,330), polyisocyanates containing allophanate groups (British Patent 994,890), polyisocyanates containing isocyanurate groups (U.S. Pat. No. 3,001,973), polyisocyanates containing acylated urea groups (German Patentschrift 1,230,778), polyisocyanates containing bioret groups (U.S. Pat. Nos. 3,124,605, 3,201,372, and 3,124,605), polyisocyanates produced by telomerization reactions (U.S. Pat. No. 3,654,106), polyisocyanates containing ester groups (U.S. Pat. No. 3,567,763), reaction products of the above-mentioned isocyanates with acetals (German Patentschrift 1,072,385), and polyisocyanates containing polymeric fatty acid esters (U.S. Pat. No. 3,455,883).

It is also possible to use distillation residues containing isocyanate groups which are obtained in the production of isocyanates on an industrial scale, optionally in solution in one or more of the above-mentioned polyisocyanates. Mixtures of the polyisocyanates mentioned above may also be used.

In general, it is particularly preferred to use the commercially readily available polyisocyanates, for example, 2,4- and 2,6-toluene diisocyanate and any mixtures of these isomers ("TDI"), diphenylmethane-2,4′- and/or -4,4′-diisocyanate ("MDI"), polyphenyl polymethylene polyisocyanates of the type obtained by phosgenation of aniline-formaldehyde condensates ("crude MDI"), and polyisocyanates containing carbodiimide groups, urethane groups, allophanate groups, isocyanurate groups, urea groups, or bioret groups ("modified polyisocyanates"), particularly modified polyisocyanates of the type derived from 2,4- and/or 2,6-toluene diisocyanate or from 4,4′- and/or -2,4′-diphenylmethane diisocyanate.

Component (b) may be selected from any aliphatic, cycloaliphatic, aromatic, or heterocyclic compound containing at least two epoxide groups, preferably 1,2-epoxide groups. Preferred polyepoxides suitable as component (b) contain 2 to 4 (preferably 2) epoxide groups per molecule and have an epoxide equivalent weight of about 90 to about 500 (preferably 170 to 220).

Suitable polyepoxides (b) include polyglycidyl ethers of polyhydric phenols, such as pyrocatechol, resorcinol, hydroquinone, 4,4′-dihydroxydiphenylmethane, 4,4′-dihydroxy-3,3′-dimethyldiphenylmethane, of 4,4′-dihydroxydiphenylmethane, 4,4′-dihydroxydiphenylcyclohexane, of 4,4′-dihydroxy-3,3′-dimethyldiphenylpropane, 4,4′-dihydroxybiphenyl, 4,4′-dihydroxydiphenyl sulfone, and tris(4-hydroxyphenyl)methane, as well as chlorination and bromination products of the above-mentioned diphenols; of novolaks (i.e., reaction products of monohydric or polyhydric phenols with aldehydes, preferably formaldehyde, in the presence of acidic catalysts); of diphenols obtained by esterification of 2 moles of the sodium salt of an aromatic hydroxycarboxylic acid with 1 mole of a dihaloalkane or dihalodialkyl ether (see British Patent 1,017,612); or of polyphenols obtained by condensation of phenols and long-chain haloparaffins containing at least two halogen atoms (see British Patent 1,024,288). Other suitable polyepoxides include polyepoxide compounds based on aromatic amines and epichlorohydrin, such as N-di(2,3-epoxypropyl)aniline, N,N′-dimethyl-N,N′-diepoxypropyl-4,4′-diaminodiphenylmethane, N-(diepoxypropyl)-4-aminophenyl glycidyl ether (see British Patents 772,830 and 816,923).

Also suitable for use as component (b) are glycidyl esters of polybasic aromatic, aliphatic, and cycloaliphatic carboxylic acids. Examples of such glycidyl esters include phthalic acid diglycidyl ester, adipic acid diglycidyl ester, glycidyl esters of reaction products of 1 mole of an aromatic or cycloaliphatic dicarboxylic anhydride and ½ mole of a diol or 1/n mole of a polyol containing n hydroxy groups, and hexahydrophthalic acid diglycidyl esters optionally substituted by methyl groups.

Glycidyl ethers of polyhydric alcohols, such as butane-1,4-diol, butene-1,4-diol, glycerol, trimethylolpropane, pentaerythritol, and polyethylene glycols, may also be used. Triglycidyl isocyanurate, N,N'-diepoxypropyl oxamide, polyglycidyl thioethers of polyfunctional thiols such as bis(mercaptomethyl)benzene, diglycidyl trimethylene trisulfone, and polyglycidyl ethers based on hydantoins, are also suitable.

It is also possible to use epoxidation products of polyunsaturated compounds, such as vegetable oils and their conversion products; epoxidation products of diolefins and polyolefins, such as butadiene, vinyl cyclohexene, 1,5-cyclooctadiene, and 1,5,9-cyclododecatriene; epoxidation products of polymers and copolymers containing epoxidizable double bonds, such as those based on polybutadiene, polyisoprene, butadienestyrene copolymers, divinylbenzene, dicyclopentadiene, and unsaturated polyesters; epoxidation products of olefins such as those obtained by Diels-Adler addition and subsequent conversion into polyepoxides by epoxidation with per compounds; and epoxidation products of compounds which contain two cyclopentene rings or cyclohexene rings attached by bridge atoms or groups or bridge atoms. Polymers of unsaturated monoepoxides, for example, of methacrylic acid glycidyl ester or allyl glycidyl ether, are also suitable.

Preferred polyepoxide compounds or mixtures used as component (b) include polyglycidyl ethers of polyhydric phenols, particularly bisphenol A; polyepoxide compounds based on aromatic amines, more particularly bis(N-epoxypropyl)aniline, N,N'-dimethyl-N,N'-diepoxypropyl-4,4'-diaminodiphenylmethane, and N-diepoxypropyl-4-aminophenyl glycidyl ether; polyglycidyl ethers of cycloaliphatic dicarboxylic acids, more particularly hexahydrophthalic acid diglycidyl esterl; and polyepoxides of the reaction product of n moles of hexahydrophthalic anhydride and 1 mole of a polyol containing n hydroxyl groups (wherein n is an integer of 2 to 6), more particularly 3 moles of hexahydrophthalic anhydride and 1 mole of 1,1,1-trimethylolpropane, 3,4-epoxycyclohexylmethane-3,4-epoxycyclohexanecarboxylate.

In special cases, liquid polyepoxides or low viscosity diepoxides, such as bis(N-epoxypropyl)aniline or vinyl cyclohexane diepoxide, can further reduce the viscosity of polyepoxides that are already liquid or can convert solid polyepoxides into liquid mixtures.

One preferred embodiment is characterized by the use of a casting resin mixture consisting of component (a), component (b), and, optionally, component (d). In this embodiment, about 50 to about 99% by weight of component (a) and about 0.1 to about 50% by weight of component (b) (based on the casting resin mixture) are preferably used.

Suitable polyhydroxyl compounds (c) according to the invention include low- to medium-viscosity linear or branched polyether polyols and/or polyester polyols containing primary and/or secondary hydroxyl groups. Polyether polyols can be obtained in known manner by reaction of polyfunctional starter molecules, such as ethylene glycol, propylene glycol, glycerol, 1,4-butanediol, trimethylolpropane, pentaerythritol, sorbitol, hexanetriol, and the like, or mixtures thereof, with ethylene oxide and/or propylene oxide. Polyester polyols are formed in known manner by reaction of polyalcohols of the large methyl- and polylyether polyol types described above (or mixtures thereof) with organic saturated and/or unsaturated polycarboxylic acids, including adipic acid, sebacic acid, phthalic acid, tetrahydrophthalic acid, hexahydrophthalic acid, maleic acid, and fumaric acid, or mixtures thereof. Polymers containing hydroxyl groups, preferably anhydrous phenolic resins, may also be used as the polyhydroxyl compounds. Special examples of such resins are benzyl ether phenolic resins, novolaks, resols, or substituted phenolic resins. The benzyl ether phenolic resins may be obtained by reaction of an optionally substituted phenol with an aldehyde, preferably formaldehyde, using a molar ratio of aldehyde to phenol greater than 1:1. The reaction is carried out in substantially anhydrous liquid phase at temperatures below about 130° C. in the presence of catalytic quantities of soluble metal salts dissolved in the reaction medium. Suitable solvents include naphthenates, neodecanoates, octoates, or lactates of lead, calcium, zinc, tin, manganese, copper, or magnesium. Cresol resins that are also suitable as polyhydroxyl compounds may be produced in the same way as the benzyl ether phenolic resins described above, except that the reaction of the phenol with the aldehyde is carried out in aqueous phase in an alkaline medium. These materials are substantially neutral and contain a considerable percentage of phenolic hydroxyl groups. In general, these resol resins or benzyl ether phenolic resins preferably have a ratio of phenolic hydroxyl groups to aliphatic hydroxyl groups of at least 3:1.

Suitable auxiliaries and additives (d) include inorganic or organic pigments or plasticizers, such as dioctyl phthalate, tributyl phosphate, and triphenyl phosphate. Preferred solvents (d) are high-boiling solvents, such as aromatic and aliphatic hydrocarbons, esters, ketones, and the like.

Mixtures of 1,2-epoxides and polyisocyanates, optionally together with polyhydroxyl compounds, have previously been described, for example, in German Auslegeschrift 1,115,922 and U.S. Pat. No. 4,582,723. These resins are used as electrical insulating materials for various applications. German Auslegeschrift 3,600,764 (believed to correspond to U.S. Pat. No. 4,728,676) discloses hot-curing casting resin mixtures containing an organic polyisocyanate, at least one organic compound containing two epoxide groups, a heat-activated catalyst, and, optionally, other auxiliaries and additives. European Patent Application 129,799 (believed to correspond to U.S. Pat. No. 4,562,227) describes hot-curing casting resin mixtures based on polyfunctional isocyanates as prepolymers in the form of reaction products of diphenylmethane diisocyanate and a diol and also a polyfunctional epoxy resin. None of the patents described above mentions the use of these casting resin mixtures as a binder for foundry sands. On the contrary, the patents all disclose the use of the materials as casting or impregnating resins for the electrical industry and recommend initial curing or full curing at temperatures above 100° C. to 200° C. or 250° C. This does not correspond to the cold-box process of the present invention, in which both the reaction and the curing process take place at room temperature solely under the effect of the amine catalyst (which is generally introduced in a stream of air).

Storable mixtures of part of component (a) and at least part of component (b), which are used in one particular embodiment of the application, are described in German Offenlegungsschrift 3,807,660. Mixtures of at least part of component (a) with at least part of component (b) that react in a preliminary reaction step to form an intermediate product containing oxazolidinone and isocyanurate groups (the reaction being terminated at a conversion of no more than 65% of the isocyanate groups present in the starting mixture by addition of a reaction inhibitor) and which are used in another particular embodiment of the present invention, are the subject of German Offenlegungsschrift 3,644,382 (believed to correspond to U.S. Pat. No. 4,788,224). These patents, however, do not disclose the process of the present invention for the preparation of foundry cores and molds.

The casting resin mixture is normally used as a two-component system, particularly when polyhydroxyl compounds are used. The two components are combined just before processing and mixing with the sand. The first component is normally the organic polyisocyanate, whereas the second component is the polyhydroxyl compound. The organic compound containing epoxide groups may be added both to the polyhydroxyl compound and—taking into account German Offenlegungsschriften 3,644,382 and 3,807,660 discussed above—to the organic polyisocyanate. As already mentioned, both components are normally diluted to processable viscosities by addition of the solvents described above. Without using polyhydroxyl compounds, it is possible—again taking into account German Offenlegungsschriften 3,644,382 and 3,807,660 discussed above—to prepare a storable one-component mixture that represents a further simplification of the sand preparation process.

The preparation of binder-sand mixtures of types different from the present invention and subsequent processing to core sands are described in detail in U.S. Pat. No. 3,409,579. In this method, quartz sand having a grain size of H 32 or H 31 should be used for preparing binder-sand mixtures. Any blade and paddle mixer may be used for mixing. The sand is initially introduced and the components of the casting resin mixture are then added, followed by mixing for about 1 to 2 minutes. The free-flowing sand mixture is then ready for processing, for example, within the mold of a standard cold-box unit. In particular, a core shooting machine having a suitable cold-box attachment is used for core production. By virtue of the very favorable flow properties of the sand, the shooting pressure may be reduced to between about 3 and 4 atmospheres gauge pressure, depending on the type of core, without adversely affecting the quality of the core surface. Core boxes of cast epoxy resin and wood may be used. The proportion of binder, based on the amount of sand, is preferably about 0.25 to 5% by weight. The liquid catalyst is introduced into the core using an inert carrier gas, such as air, and cures the core instantly on contact with the hardening agent. In this regard, it is important that the catalyst reach all parts of the core, which is achievable, for example, by mandrel blowing and venting through appropriate nozzles. Optimal conditions must generally be established for each individual case. The catalyst is sprayed with a gas stream under a pressure of about 1.5 to 2 atmospheres gauge pressure. A few minutes and, optimally, approximately 1 minute should normally be sufficient. Subsequent injection of gas at about 4 to 6 atmospheres gauge pressure is advisable to assure thorough distribution of the catalyst and simultaneous removal of any excess through the nozzles. The period for which air is subsequently blown in should always be about twice as long as the injection times with the catalyst. The quantity of catalyst depends almost solely on the type and size of the core and, accordingly, is best experimentally determined. Suitable catalysts are tertiary amines, preferably tertiary amines of low volatility, such as trimethylamine, triethylamine, dimethylethylamine, dimethylisopropylamine, dimethylethanolamine, dimethylbenzylamine, and similar products.

Foundry cores and molds obtained by the process of the invention can be used to produce castings by introducing a foundry mix into the foundry core or mold.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

Examples 1 to 5

General Procedure for Core Sand Preparation and Core Production

Sand having a grain size of H 31 (1,000 g) was introduced and thoroughly stirred with 30 g of each binder mixture described in detail below. The sand-binder mixture was introduced into the mold of a standard cold-box unit and treated for 60 seconds with a mixture of triethylamine and air. The finished, bound sand core was then removed from the mold and evaluated for appearance and strength.

The sand was stored in sealed containers at room temperature. After certain intervals (see Table below), the flow properties of the sand and the quality of a cured sand core were evaluated.

Description of the Binders

All of the binders were used as 80% solutions in a mixture of aromatic alkyl compounds. In all examples cumene is used as solvent.

BM 1

80 parts mixture of diphenylmethane-2,4'- and -4,4'-diisocyanate ("2,4'- and 4,4'-MDI") in a ratio of 1:1
20 parts bisphenol A diglycidyl ether The mixture was made stable in storage by addition of 1,000 ppm of p-toluenesulfonic acid methyl ester at 100° C. See German Offenlegungsschrift 3,807,660.

BM 2

80 parts mixture of 2,4'- and 4,4'-MDI
20 parts bisphenol A diglycidyl ether

The mixture was reacted by adding 0.5 parts of dimethyl benzene amine at 100° C. to an NCO content of 20 Z and then made stable in storage in accordance with U.S. Pat. No. 4,788,224 (see also German Offenlegungsschrift 3,644,382) by addition of 100° C. ppm of p-toluenesulfonic acid methyl ester at 100 ° C.

BM 3

60 parts mixture of 2,4'- and 4,4'-MDI
40 parts bisphenol A diglycidyl ether

The mixture was made stable in storage as for binder mixture BM 1 by addition of p-toluenesulfonic acid methyl ester.

BM 4

100 parts binder mixture BM 3
20 parts polyether polyol of propoxylated triethylolpropane (OH value of 11%)

BM 5

95 parts mixture of 2,4'- and 4,4'-MDI
5 parts bisphenol A diglycidyl ether

BM 6

99.2 parts mixture of 2,4'- and 4,4'-MDI
0.8 parts bisphenol A diglycidyl ether

TABLE

| Binder Mixture: | BM 1 | BM 2 | BM 3 | BM 4 | BM 5 | BM 6 |
|---|---|---|---|---|---|---|
| Evaluation of sand-binder mixture | | | | | | |
| After 1 hr | Free-flowing | Free-flowing | Free-flowing | Free-flowing | Free-flowing | Free-flowing |
| After 8 hr | Free-flowing | Free-flowing | Free-flowing | Free-flowing | Free-flowing | Free-flowing |
| After 24 hr | Free-flowing | Free-flowing | Free-flowing | Free-flowing | Free-flowing | Free-flowing |
| After 48 hr | Free-flowing | Sticks | Free-flowing | Free-flowing | Free-flowing | Free-flowing |
| After 72 hr | Free-flowing | Sticks | Sticks | Free-flowing | Free-flowing | Free-flowing |
| Evaluation of the cured sand cores (processing after indicated time) | | | | | | |
| 1 hr | Acceptable | Acceptable | Acceptable | Acceptable | Acceptable | Acceptable |
| 8 hr | Acceptable | Acceptable | Acceptable | Acceptable | Acceptable | Acceptable |
| 24 hr | Acceptable | Acceptable | Acceptable | Acceptable | Acceptable | Acceptable |
| After preparation of the sand-binder mixture | | | | | | |
| Heat resistance ($T_G$, °C.)[1] of the pure resin mixture | 300 | 150 | >300 | 250 | >300 | >300 |
| E modulus of the pure resin mixture | 3500 | 3500 | 3500 | 3500 | 3500 | 3400 |

[1] $T_G$: glass transition temperature

What is claimed is:

1. In a method for the preparation of foundry cores and molds comprising combining a filler and a casting resin mixture and curing the combined filler and casting resin mixture at room temperature in the presence of an amine catalyst which is introduced as a gas or an aerosol, the improvement wherein said casting resin mixture comprises
   (a) 50 to 99.2%, based on the total quantity of resin, of at least one organic polyisocyanate,
   (b) 0.8 to 40%, based on the total quantity of resin, of at least one organic compound containing at least two epoxide groups, and
   (c) 0 to 17%, based on the total quantity of resin, of a polyhydroxyl compound.

2. A process according to claim 1 wherein the casting resin mixture additionally comprises
   (d) auxiliaries, additives, and solvents.

3. A process according to claim 1 wherein the filler is sand.

4. A process according to claim 1 wherein the combined filler and casting resin mixture is introduced into a mold of a cold-box unit before curing.

5. A process according to claim 4 wherein the combined filler and casting resin mixture is cured in said cold-box unit by introduction of a catalyst.

6. A process according to claim 5 wherein the catalyst is introduced with a carrier gas.

7. A process according to claim 1 wherein the ratio of reactive isocyanate groups to hydroxyl groups in the casting resin mixture is greater than 1.1:1.

8. A process according to claim 1 wherein the ratio of reactive isocyanate groups to hydroxyl groups in the casting resin mixture is greater than 1.5:1.

9. A process according to claim 1 wherein the casting resin mixture consists of components (a) and (b).

10. A process according to claim 2 wherein the casting resin mixture consists of components (a), (b), and (d).

11. A process according to claim 1 wherein the organic polyisocyanate (a) corresponds to the formula $$Q(NCO)_n$$

wherein
n is a number from 2 to 4 and
Q is an aliphatic hydrocarbon group containing from 2 to 18 carbon atoms, a cycloaliphatic hydrocarbon group containing from 4 to 15 carbon atoms, an aromatic hydrocarbon group containing from 6 to 15 carbon atoms, or an araliphatic hydrocarbon group containing from 8 to 15 carbon atoms.

12. A process according to claim 1 wherein the organic polyisocyanate (a) is a polyisocyanate of the diphenylmethane series.

13. A process according to claim 12 wherein the polyisocyanate of the diphenylmethane series is 4,4'- and/or -2,4'-diphenylmethane diisocyanate.

14. A method for the production of castings comprising introducing a foundry mix into a foundry core or mold prepared by the process of claim 1.

15. A process for the preparation of foundry cores and molds comprising combining a filler and a casting resin mixture and curing the combined filler and casting resin mixture at room temperature in the presence of an amine catalyst which is introduced as a gas or an aerosol, wherein said casting resin mixture comprises
   (a) 50 to 99.2%, based on the total quantity of resin, of at least one organic polyisocyanate, (b) 0.8 to 40%, based on the total quantity of resin, of at least one organic compound containing at least two epoxide groups, and (c) 0 to 17%, based on the total quantity of resin, of a polyhydroxyl compound;

wherein at least part of component (a) is mixed with at least part of component (b) in a preliminary reaction to form an intermediate composition and wherein a reaction inhibitor is added to terminate said preliminary reaction and to convert said intermediate composition into a storable form.

16. A process for the preparation of foundry cores and molds comprising combining a filler and a casting resin mixture and curing the combined filler and casting resin mixture at room temperature in the presence of an amine catalyst which is introduced as a gas or an aerosol, wherein said casting resin mixture comprises (a) 50 to 99.2%, based on the total quantity of resin, of at least one organic polyisocyanate, (b) 0.8 to 40%, based on the total quantity of resin, of at least one organic compound containing at least two epoxide groups, and (c) 0 to 17%, based on the total quantity of resin, of a polyhydroxyl compound;

wherein at least part of component (a) is mixed with at least part of component (b) in a preliminary reaction to form an intermediate composition containing oxazolidinone and isocyanurate groups and wherein a reaction inhibitor is added to terminate said preliminary reaction at a conversion of no more than 65% of the isocyanate groups originally present, thereby converting said intermediate composition into a storable form.

* * * * *